United States Patent Office 3,538,345
Patented Nov. 3, 1970

3,538,345

PHASE DEMODULATOR CIRCUITS

Albert Norz, Stuttgart-Zuffenhausen, Germany, assignor to International Standard Electric Corporation, New York, N.Y., a corporation of Delaware Filed Dec. 12, 1967, Ser. No. 689,954
Claims priority, application Germany, Dec. 17, 1966, St 26,258
Int. Cl. H03k 5/20
U.S. Cl. 307—232 4 Claims

ABSTRACT OF THE DISCLOSURE

A phase demodulator wherein the received data signal to be demodulated is multiplied by a reference carrier and by the reference carrier shifted by 90°. The reference carrier is derived from the received data signal. Simplified digital switching and logic circuitry is used to provide pulses sequenced in accordance with the phase shifts.

The present invention relates in general to demodulator circuits and more particularly to demodulator circuits for effecting 4-phase differential demodulation on the basis of digital switching circuits. The sine- and cosine-components of the phase of the data signals are converted into DC signals, relative to another reference AC voltage whose frequency is equal to the carrier frequency for at least a period of one identification section. The DC signals are stored for the period of the successively following identification section. The reference carrier is generated in such a way that its phase can be shifted only by discrete values with respect to the phase of the data signals.

Known types of demodulator circuits for effecting 4-phase differential modulation require a considerable number of trigger circuits and logical switching circuits with static as well as dynamic inputs.

Accordingly, it is an object of the invention to provide particularly reliable demodulator circuits of the aforementioned kind in which only static types of logical circuits are required.

A related object of this invention is to provide such 4-phase differential modulation with a relative paucity of trigger circuits.

A circuit embodying the present invention accomplishes these and other objects, in that the first step of the demodulation is realized by multiplying (as effected with the aid of a multiplier circuit) the received data signal: i.e., cos $(\omega_r t+x\pi/2)$; wherein $\omega_r$ is supposed to indicate the reference carrier frequency, and $x$ the data information; by the reference carrier sin $(\omega_r t+n\pi/2+\pi/4)$ as obtained from the data signal, and also by the reference carrier cos $(\omega_r t+x\pi/2)$ as phase-shifted by $\pi/2$ (in which $n$ is supposed to be the uncertainty of the reference carrier). The product signal is demodulated. The demodulated signals designated I and Q are stored in binary storage devices. For the purpose of realizing the second step of the demodulation or decoding respectively, the newly received binary signals I and Q, as well as stored binary signals designated I′ and Q′ of the preceding identification interval (all of the binary signals are in the form of marking potentials applied to one and only one conductor of each of four signal conductor pairs) are fed to the corresponding, pairwise arranged inputs of a static receiving logic circuit for producing the step sequence corresponding to the phase shifts (jumps).

According to one important feature of the invention, the static receiving logic circuit has two outputs. One of the outputs satisfies the logical requirement:

$$I\cdot\overline{Q}\cdot Q'+I\cdot Q\cdot\overline{I}'+\overline{I}\cdot Q\cdot\overline{Q}'+\overline{I}\cdot Q\cdot I'$$

and the other output satisfies the condition $$I\cdot\overline{Q}\cdot\overline{I}'+I\cdot Q\cdot\overline{Q}'+\overline{I}\cdot Q\cdot I'+\overline{I}\cdot\overline{Q}\cdot Q'$$

Further details and advantageous embodiments of the circuit proposed by the present invention will result from the following description and from FIGS. 1 to 4 of the accompanying drawings, of which:

Figures 3A, 3B:
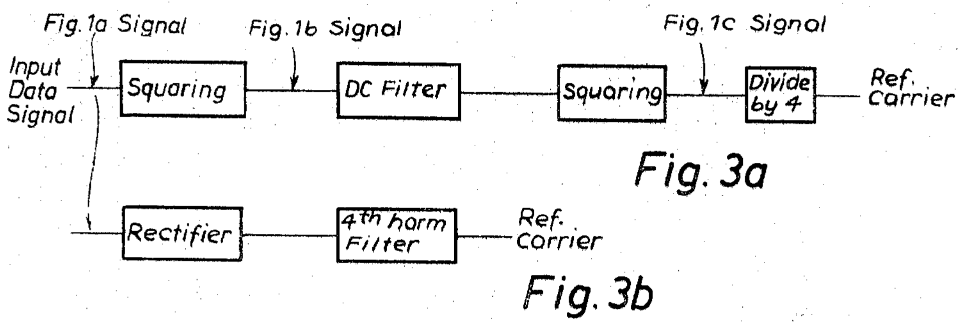
Figure 4:
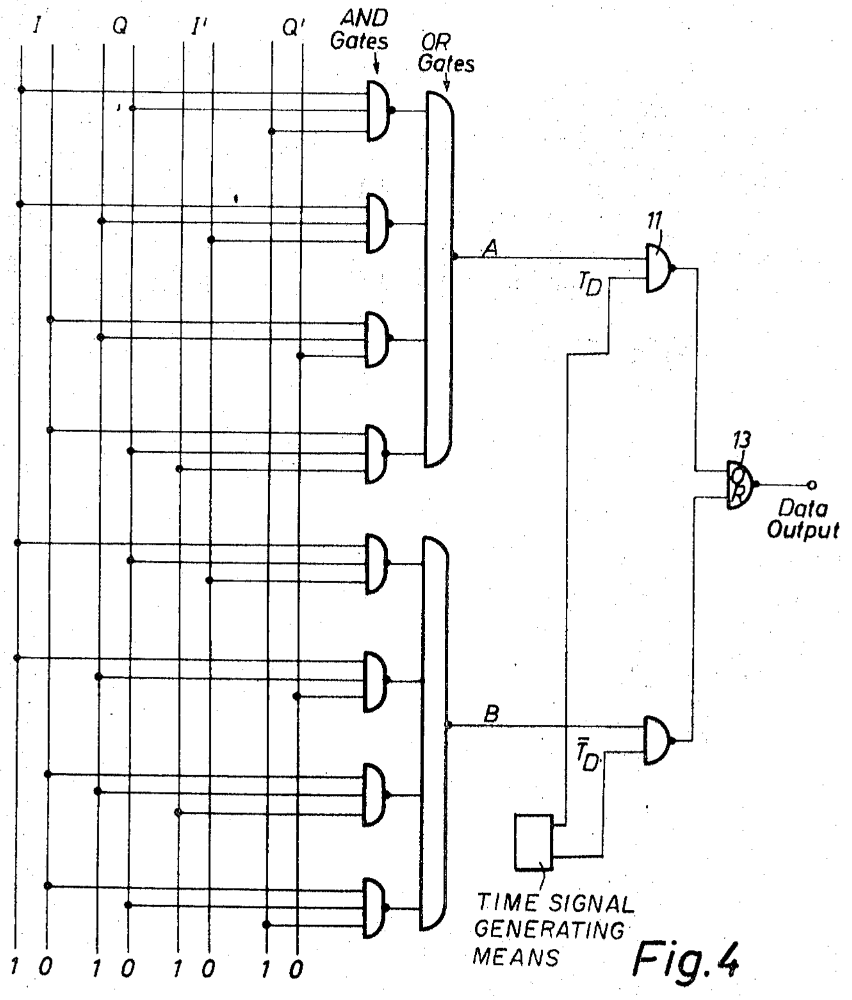

FIGS. 3*a* and 3*b* show in block diagram form circuitry for generating the reference carrier, and FIG. 4 shows the basic circuit diagram of the receiving logic circuit.

The major difficulty arising in connection with the demodulation of phase-difference modulated signals resides in the fact that the phase of one identification section must be stored for a period corresponding to the sequentially following identification section. The known methods for solving this problem are:

(1) The phase is stored in an oscillating circuit;

(2) The signal is stored in a delay line;

(3) The sine- and cosine-components of the phase of the signal, as converted into DC signals, with respect to another reference AC voltage (signal), the frequency of which is equal to the carrier frequency are stored for at least the period of one identification section. Thereafter, the phase-difference of two successively following identification sections $n$ and $n-1$ is formed and equals:

$$\varphi_n-\varphi_{n-1}=(\varphi_B-\varphi_{n-1})-(\varphi_B-\varphi_n)$$

wherein $\varphi_B$ indicates the phase of the reference voltage.

The third method can be simplified particularly from the circuit point of view when the reference carrier is generated so that its phase can only be shifted by discrete values with respect to the phase of the data signal. In that case—as is also done in accordance with the invention—digital storage devices may be used instead of analogue storage devices.

GENERATION OF THE REFERENCE CARRIER

Figure 1A:
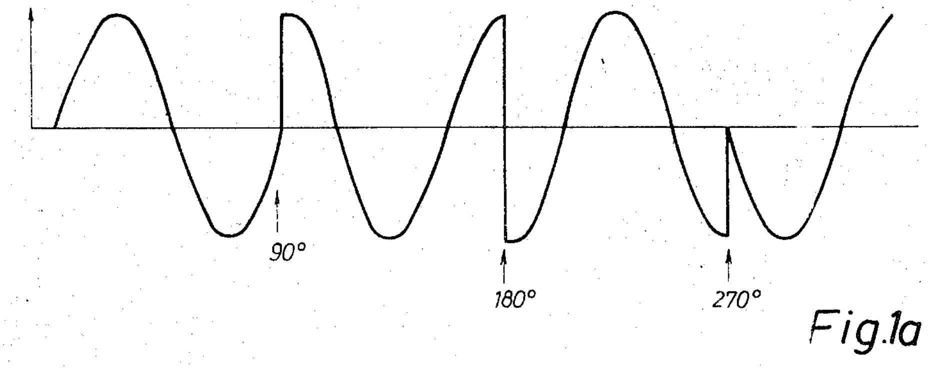
FIG. 1 shows a number of signal waveforms that occur while the reference carrier is generated.
Figure 1B:
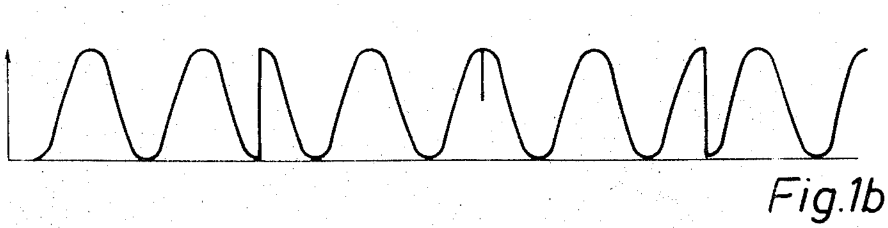
Figure 1C:
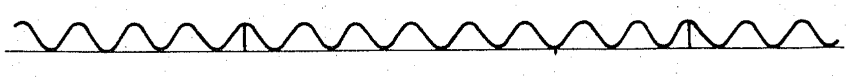

In FIG. 1*a* there is shown a data signal which successively contains 90°-, 180°- and 270°-phase shifts. When squaring this signal, a waveform according to FIG. 1*b* is formed. Upon deducting the DC component, and after a repeated squaring the fourfold carrier frequency of FIG. 1*c* is formed. The required reference carrier will be obtained by dividing down by the factor 4. In that case, however, the phase which depends on the position in which the divider is at the beginning of the division process will become uncertain by integer multiples of $\pi/2$. The same result occurs, although not as obviously when rectifying the data signal, and when filtering out the fourth harmonic therefrom.

THE DEMODULATION

The demodulation can be represented mathematically by multiplying the received data signal cos $(\omega_r t+x\pi/2)$ by the reference carrier sin $(\omega_r t+n\pi/2+\pi/4)$ and by cos $(\omega_r t+n\pi/2+\pi/4)$; where $x$ indicates the data information, $n$ indicates the uncertainty of the reference carrier.

There will be obtained (with the aid of corresponding multiplying devices of the type known per se)

$$Q=\cos(\omega_T t+x\pi/2)\cdot\sin(\omega_T t+n\pi/2+\pi/4)=\text{const.}[\sin(x-n-\tfrac{1}{2})\pi/2+\ldots]$$

$$I=\cos(\omega_T t+x\pi/2)\cdot\cos(\omega_T t+n\pi/2+\pi/4)=\text{const.}[\cos(x-n-\tfrac{1}{2})\pi/2+\ldots]$$

From this there will result the following table of assignment:

| $x$-2 | I | Q | | $x$-$n$ | I | Q |
|---|---|---|---|---|---|---|
| 0 | 1 | −1 | or in | 0 | 1 | 0 |
| 1 | 1 | 1 | binary | 1 | 1 | 1 |
| 2 | −1 | +1 | notation | 2 | 0 | 1 |
| 3 | −1 | −1 | | 3 | 0 | 0 |

The outputs I and Q of the two demodulators are accordingly binary, and may therefore be stored in binary storage devices (the values shifted by one identification interval are hereinafter designated I′ and Q′).

The following may be taken from the table:

If $x$ is changed by the value 0 (i.e. 0°-phase shift), then:

| | I | Q | I′ | Q′ |
|---|---|---|---|---|
| | 1 | 0 | 1 | 0 |
| or | 1 | 1 | 1 | 1 |
| or | 0 | 1 | 0 | 1 |
| or | 0 | 0 | 0 | 0 |

If $x$ is changed by the value 1 (i.e. 90°-phase shift), then:

| | I | Q | I′ | Q′ |
|---|---|---|---|---|
| | 1 | 0 | 1 | 1 |
| or | 1 | 1 | 0 | 1 |
| or | 0 | 1 | 0 | 0 |
| or | 0 | 0 | 1 | 0 |

If $x$ is changed by the value 2 (i.e. 180°-phase shift), then:

| | I | Q | I′ | Q′ |
|---|---|---|---|---|
| | 1 | 0 | 0 | 1 |
| or | 0 | 1 | 1 | 0 |
| or | 1 | 1 | 0 | 0 |
| or | 0 | 0 | 1 | 1 |

If $x$ is changed by the value 3 (i.e. 270°-phase shift), then:

| | I | Q | I′ | Q′ |
|---|---|---|---|---|
| | 1 | 0 | 0 | 0 |
| or | 1 | 1 | 1 | 0 |
| or | 0 | 1 | 1 | 1 |
| or | 0 | 0 | 0 | 1 |

Figure 2:
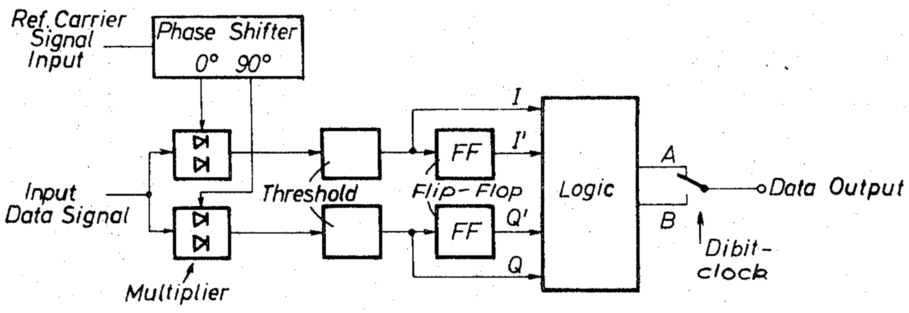
FIG. 2 shows the basic construction of the demodulator.

Accordingly, the phase shift can be determined with the aid of a static logic circuit. At the output of the static logic circuit there must still be provided a switch for converting the dual bits into single bits, as shown in FIG. 2.

With respect to the assignment of the outputs A, B to the received phase-shifts, reference is made to the following table:

| | A | B |
|---|---|---|
| 0° | 0 | 0 |
| 90° | 1 | 0 |
| 180° | 1 | 1 |
| 270° | 0 | 1 |

Accordingly, (by using the OR-symbol +):

$$A=(90°)+(180°)$$

$$B=(270°)+(180°)$$

or if for 90°, 270°, 180° there are inserted the corresponding logical combinations of I, Q, I′, Q′ as shown hereinbefore in form of a table, and likewise by using the OR-symbol or the AND-symbol respectively, there is:

$$A=I\cdot\overline{Q}\cdot I'\cdot Q'+I\cdot Q\cdot\overline{I}'\cdot Q'+\overline{I}\cdot Q\cdot\overline{I}'\cdot Q'+\overline{I}\cdot\overline{Q}\cdot I'\cdot Q'+I\cdot\overline{Q}\cdot\overline{I}'\cdot Q'+\overline{I}\cdot Q\cdot I'\cdot\overline{Q}'+I\cdot Q\cdot\overline{I}'\cdot\overline{Q}'+\overline{I}\cdot Q\cdot\overline{I}'Q'$$

When combining the first product with the fifth, the second with then penultimate, the third with the third from the last, and the fourth with the last, one, and when considering the identity $$X+\overline{X}=1$$

the following four-membered expression is obtained:

$$A=I\cdot\overline{Q}\cdot Q'+I\cdot Q\cdot\overline{I}'+\overline{I}\cdot Q\cdot\overline{Q}'+\overline{I}\cdot\overline{Q}\cdot I'$$

similarly:

$$B=I\cdot\overline{Q}\cdot\overline{I}'+I\cdot Q\cdot\overline{Q}'+\overline{I}\cdot Q\cdot I'+\overline{I}\cdot\overline{Q}\cdot Q'$$

The block diagram according to FIG. 4 is built up exactly in accordance with these logical relationships. The outputs A and B, for the purpose of converting the dual bits into single bit, are switched to the first inputs of two further AND-gates 11 and 12. The secondary inputs of the AND-gates 11 and 12 receive the dual bit rhythm $T_0$ or the inverse dual bit rhythm $\overline{T}_0$ respectively. The outputs of the AND-gates 11 and 12 are fed to an OR-circuit 13 which provides the data output.

While the principles of the invention have been described above in connection with specific apparatus and applications, it is to be understood that this description is made only by way of example and not as a limitation on the scope of the invention.

I claim:

1. A demodulator circuit for effecting 4-phase differential demodulation using digital switching circuits, said demodulator circuit comprising means for generating reference carrier signals from received data signals, means for phase shifting said reference signals by 90°, first multiplying means for multiplying said data signals by said reference carrier signals to provide first demodulated signals, second multiplying means for multiplying said data signal by said phase shifted reference carrier signals to provide second demodulated signals, binary storage means for storing said first and said second demodulated signals to provide first and second binary signals and to delay said first and second binary signals for one identification period, means for decoding the binary signals comprising static receiving logic means, said static receiving logic means including means for respectively producing at first and second outputs the logical condition $$A=I.\overline{Q}.Q'+I.Q.\overline{I}'+\overline{I}.Q.\overline{Q}'+\overline{I}.\overline{Q}.I'$$

and $$B=I.\overline{Q}.\overline{I}'+I.Q.\overline{Q}'+\overline{I}.Q.I'+\overline{I}.\overline{Q}.Q'$$

means for coupling the first and second binary signals in the first and second delayed binary signals to said logic means, and said coupling means comprising four signal conductor pairs for producing pulse sequences corresponding to modulating phase shifts indicative of the transmitted data.

2. A demodulator circuit for effecting 4-phase differential demodulation using digital switching circuits, said demodulator circuit comprising means for generating reference carrier signals from received data signals, means for phase shifting said reference signals by 90°, first multiplying means for multiplying said data signals by said reference carrier signals to provide first demodulated signals, second multiplying means for multiplying said data signal by said phase shifted reference carrier signals to provide second demodulated signals, binary storage means for storing said first and said second demodulated signals to provide first and second binary signals and to delay said first and second binary signals for one identification period, means for decoding the binary signals comprising static receiving logic means,
means for coupling the first and second binary signals and the first and second delayed binary signals to said logic means,
said coupling means comprising four signal conductor pairs for producing pulse sequences corresponding to modulating phase shifts indicative of the transmitted data,
means at the output of said logic means including at least two output AND gates,
each of said output AND gates comprising at least two inputs,
means for sequentially supplying each of said first and second outputs of said receiving logic to one input of each of said two inputs of said output AND gates,
time signal generating means having two sequential outputs,
means for individually coupling a different one of said sequential outputs to the other input of said output AND gates output OR gate means, and
means for coupling the outputs of said output AND gates to the inputs of said OR gate means to provide the data output in a single series of bits.

3. A demodulator circuit for effecting 4-phase differential demodulation using digital switching circuits,
said demodulator circuit comprising means for generating reference carrier signals from received data signals,
said reference carrier signal generating means including squaring means for squaring the data signals,
means for removing the D.C. components from said squared data signals and for squaring the resulting signals again,
means for dividing the frequency of the resquared signals by 4,
means for phase shifting said reference signal by 90°,
first multiplying means for multiplying said data signals by said reference carrier signals to provide first demodulated signals,
second multiplying means for multiplying said data signal by said phase shifted reference carrier signals to provide second demodulated signals,
binary storage means for storing said first and said second demodulated signals to provide first and second binary signals and to delay said first and second binary signals for one identification period,
means for decoding the binary signals comprising static receiving logic means,
means for coupling the first and second binary signals and the first and second delayed binary signals to said logic means, and
said coupling means comprising four signal conductor pairs for producing pulse sequences corresponding to modulating phase shifts indicative of the transmitted data.

4. A demodulator circuit for effecting 4-phase differential modulation using digital switching circuits,
said demodulator circuit comprising means for generating reference carrier signals from received data signals,
said reference carrier signal generating means comprising means for rectifying the data signal,
means for filtering the fourth harmonic out of said rectified data signal,
means for phase shifting said reference signals by 90°,
first multiplying means for multiplying said data signals by said reference carrier signals to provide first demodulated signals,
second multiplying means for multiplying said data signal by said phase shifted reference carrier signals to provide second demodulated signals,
binary storage means for storing said first and said second demodulated signals to provide first and second binary signals and to delay said first and second binary signals for one identification period,
means for decoding the binary signals comprising static receiving logic means,
means for coupling the first and second binary signals and the first and second delayed binary signals to said logic means, and
said coupling means comprising four signal conductor pairs for producing pulse sequences corresponding to modulating phase shifts indicative of the transmitted data.

References Cited

UNITED STATES PATENTS

| | | | |
|---|---|---|---|
| 2,933,682 | 4/1960 | Moulton et al. | 328—133 X |
| 3,253,223 | 5/1966 | Kettel | 328—133 X |

FOREIGN PATENTS

| | | |
|---|---|---|
| 1,129,180 | 5/1962 | Germany. |

DONALD D. FORRER, Primary Examiner

R. C. WOODBRIDGE, Assistant Examiner

U.S. Cl. X.R.

328—133, 166; 329—112